United States Patent [19]

Vaeth et al.

[11] 4,357,378

[45] Nov. 2, 1982

[54] MAGNETIC RECORDING MEDIA

[75] Inventors: Guenter Vaeth, Limburgerhof; Rudolf Bachmann, Frankenthal; Werner Senkpiel, Laudenbach; Hans-Joerg Hartmann, Freinsheim; Roland Falk, Achern; Herbert Motz, Ludwigshafen, all of Fed. Rep. of Germany

[73] Assignee: BASF Aktiengesellschaft, Ludwigshafen, Fed. Rep. of Germany

[21] Appl. No.: 234,708

[22] Filed: Feb. 17, 1981

Related U.S. Application Data

[63] Continuation of Ser. No. 853,398, Nov. 21, 1977, abandoned, which is a continuation of Ser. No. 459,453, Apr. 10, 1974, abandoned.

[30] Foreign Application Priority Data

Apr. 14, 1973 [DE] Fed. Rep. of Germany ....... 2318910

[51] Int. Cl.$^3$ .................................................. B32B 3/02
[52] U.S. Cl. .................................... 428/64; 428/425.8; 428/425.9; 428/463; 428/522; 428/694; 428/900
[58] Field of Search ................................. 427/127–132, 427/48; 428/900, 64, 694, 425.8, 425.9, 522, 463; 252/62.54

[56] References Cited

U.S. PATENT DOCUMENTS 3,278,477 10/1966 Evan .................................... 523/455
3,649,541 3/1972 Ingersoll ........................... 428/425.9

*Primary Examiner*—Bernard D. Pianalto
*Attorney, Agent, or Firm*—Keil & Witherspoon

[57] ABSTRACT

The invention relates to magnetic recording media comprising a non-magnetic base and, applied thereto, a firmly adhering magnetic coating based on a finely divided magnetic pigment and a special binder mixture. This binder mixture consists essentially of 20 to 90 percent by weight of an elastomeric polyurethane which is soluble in a volatile organic solvent, is practically free of isocyanate groups and has been obtained from a linear, aliphatic polyester or polyether and a diisocyanate of 6 to 24 carbon atoms, and of 10 to 80 percent by weight of a vinyl chloride copolymer which contains 50 to 90 percent by weight of vinyl chloride units and 10 to 50 percent by weight of units of one or more diesters of maleic acid with an alcohol of 1 to 3 carbon atoms, or of the reaction product of this binder mixture with a polyisocyanate of 6 to 50 carbon atoms. Magnetic coatings containing such a binder mixture are distinguished by improved surface hardness coupled with improved orientability of the magnetic particles, as a result of which such recording media are particularly suitable for modern video- and audio-recording instruments.

10 Claims, No Drawings

MAGNETIC RECORDING MEDIA

This is a continuation of application Ser. No. 853,398, Nov. 21, 1977, which is a continuation of Ser. No. 459,453, filed Apr. 10, 1974, both now abandoned.

This application discloses and claims subject matter described in German patent application No. P 23 18 910.8, filed Apr. 14, 1973, which is incorporated herein by reference.

The present invention relates to magnetic recording media comprising a non-magnetic base and, applied thereto, a firmly adhering magnetic coating based on a finely divided magnetic pigment and a special binder mixture.

Magnetic coatings which should bring about an improvement in the quality of the magnetic recording must satisfy various requirements. On the one hand, the magnetic recording medium should have excellent mechanical properties, particularly with respect to flexibility, elasticity, tensile strength and abrasion resistance, so as to permit sustained and trouble-free operation even when used under extreme conditions; on the other hand, the electromagnetic properties of the magnetic coating are a further essential criterion of the quality of the recording medium. Particularly when used on modern video recorders and high-quality tape recorders, it is necessary that the magnetic coatings should display a particularly high residual induction in the recording direction. Such magnetic coatings, on the one hand, contain a high proportion of magnetizable material in the coating whilst, on the other hand, the magnetizable acicular particles possess a pronounced degree of orientation in the direction of tape motion. Whether these requirements are met depends not only on the magnetic pigment used but also, to a high degree, on the binder used in the magnetic coating. A binder which supports such particularly high loadings of magnetic pigment in the magnetic coating should be able to do so without substantially impairing the performance of the recording medium with respect to elasticity and abrasion resistance. In addition, the binder in the coating should be capable of being compressed during calendering, which is essential for the production of high-quality magnetic coatings, and should give very smooth surfaces after this treatment. Further, the binder should allow the magnetic particles dispersed therein to attain a particularly high degree of orientation in the direction of tape travel when passed through a magnetic field immediately after coating.

It is known to produce magnetic recording media which can be subjected to severe mechanical stresses, using dispersions of magnetic pigments in binders based on polyurethane elastomers or mixtures of polyurethane elastomers with other polymeric binders as the magnetic coating. Polyester-urethanes, such as are described, for example, in German Printed Application No. 1,106,959 or polyether-urethanes, such as are described in U.S. Pat. No. 2,899,411, however, do not impart sufficient hardness to the surface of the magnetic coating when they are used as sole binder in the magnetic coating. In addition, polyurethanes used as sole binders suffer from the disadvantage that magnetic particles dispersed in solutions thereof do not orient satisfactorily when passed through a magnetic field.

There has been no lack of attempts to overcome the disadvantages resulting from the use of polyurethanes as sole binders in magnetic coatings, by admixing a further binder. For example, German Printed Application No. 1,269,661 states that the hardness of the coating can be improved by the admixture of a polyester. However, when this binder combination is used, there is a danger that adjacent layers of tape in the pack may stick together under conditions of elevated temperature and pressure. German Printed Application No. 1,295,011 discloses the modification of polyurethanes, for use as binders in magnetic coatings, with relatively high molecular weight phenoxy resins, such as those marketed by Union Carbide Corp., USA, under the name of phenoxy resin PKHH. Such mixtures show satisfactory mechanical properties up to temperatures of about 65° C. but the co-use of the phenoxy resin results in poor orientability of the acicular magnetic particles in the magnetic field. It is also known to use mixtures of vinyl chloride copolymers with polyurethanes as binders in magnetic tapes. Vinyl chloride copolymers exhibit in some respects satisfactory mechanical properties and improve the orientability of the magnetic particles in the magnetic field. For example, U.S. Pat. No. 3,144,352 describes the addition of vinyl chloride/acrylonitrile copolymers to polyurethanes, but the relatively low thermal stability of the resulting products is a disadvantage (cf. German Published Application No. 2,037,605). German Printed Application No. 1,282,700 describes the combination of polyurethanes with vinyl chloride/vinyl acetate copolymers for use in magnetic coatings, but these combinations do not exhibit the properties required in practice at elevated temperatures. Mixtures of polyester-urethanes with polycarbonates, as proposed in German Published Application No. 2,114,611, on the other hand, do not give solutions which are entirely satisfactory as regards their viscosity.

We have now found that the surface hardness of the magnetic coating can be advantageously improved, whilst at the same time achieving the greatest possible improvement in the orientability of the magnetic particles, by adding to the polyurethane, as modifying component, a vinyl chloride copolymer which contains from 50 to 90 percent by weight of vinyl chloride units and from 10 to 50 percent by weight of units of one or more dialkyl maleates. Aliphatic alcohols of 1 to 3 carbon atoms can be used as the alcohol components of these maleic acid esters.

Accordingly, the present invention relates to magnetic recording media comprising a non-magnetic base and a magnetic coating firmly bonded thereto, the coating consisting essentially of a dispersion of finely divided magnetic pigments in a binder mixture containing polyurethane, which media exhibit good abrasion resistance and surface hardness and improved magnetic properties, especially higher orientation ratios and packing densities in the magnetic coatings, and are characterized in that the binder mixture of the magnetic coating consists essentially of 20 to 90 percent by weight of an elastomeric polyurethane which is soluble in a volatile organic solvent, is practically free of isocyanate groups and is obtained from a linear aliphatic polyester or polyether and a diisocyanate of 6 to 24 carbon atoms, and 10 to 80 percent by weight of a vinyl chloride copolymer which contains from 50 to 90 percent by weight of vinyl chloride units and from 10 to 50 percent by weight of units of one or more diesters of an aliphatic alcohol of 1 to 3 carbon atoms with maleic acid, or of the reaction product of this binder mixture with a polyisocyanate of 6 to 50 carbon atoms.

Particularly advantageous magnetic recording media are those in which the binder mixture containing the polyurethane is a mixture of (A1) from 20 to 90, and preferably from 40 to 80, percent by weight of an elastomeric, thermoplastic polyester-urethane which is practically free of isocyanate groups, such as is described in German Printed Application No. 1,106,959 and is manufactured from an aliphatic dicarboxylic acid of 4 to 6 carbon atoms, an aliphatic diol of 4 to 10 carbon atoms and a diisocyanate of 6 to 24, and especially of 8 to 20, carbon atoms, or (A2) from 20 to 90, and preferably from 40 to 80, percent by weight of a thermoplastic, elastomeric polyether-urethane which is practically free of isocyanate groups, such as is described in U.S. Pat. No. 2,899,411, and is manufactured from an aliphatic polyether, such as the polycondensate of an aliphatic diol of 3 to 6 carbon atoms, or the polymer of a cyclic ether of 3 to 6 carbon atoms, and a diisocyanate of 8 to 20 carbon atoms, and (B) from 10 to 80, and preferably from 20 to 60, percent by weight of a copolymer of vinyl chloride which contains from 50 to 90 percent by weight of vinyl chloride units and from 10 to 50 percent by weight units of one or more dialkyl maleates, or for example two different dialkyl maleates, of which the alcohol component has a chain length of 1 to 3 carbon atoms, and in particular a copolymer which contains from 70 to 90 percent by weight of vinyl chloride units and from 10 to 30 percent by weight of units of the said dialkyl maleates.

We have also found that magnetic recording media of the said type exhibiting even better properties can be obtained by effecting crosslinking of the binder mixture by adding a relatively small amount, in particular from 1 to 15 percent by weight, based on the amount of binder, of a polyisocyanate of 6 to 50, and especially of 8 to 40, carbon atoms during or after mixing of the binder mixture with the finely divided magnetic pigment.

The elastomeric polyurethanes which are practically free of isocyanate groups, are soluble in a volatile organic solvent and are obtained from a linear aliphatic polyester or polyether and a polyisocyanate, and which are to be used in accordance with the invention as one component of the binder mixture for the magnetic coating, are known per se and some of them are commercially available (cf. Saunders-Frisch; Polyurethanes, Chemistry and Technology, Volume 2, Chapter IX, New York, 1964, and the literature cited therein).

The soluble, thermoplastic polyester-urethanes which are practically free of isocyanate groups and have been mentioned as being very suitable for use in the binder mixture according to the invention are also known per se and are the same as those which can be prepared by the method of German Printed Application No. 1,106,959. They are linear polyester-urethanes, manufactured by reacting a polyester of an aliphatic dicarboxylic acid of 4 to 6 carbon atoms, such as adipic acid, and one or more aliphatic diols of 3 to 10 carbon atoms, such as 1,2- or 1,3-propylene glycol, 1,4-butanediol, diethylene glycol, 1,6-hexanediol, neopentyl glycol ot 1,8-octanediol, with a diisocyanate of 6 to 24, and especially of 8 to 20, carbon atoms, such as toluylenediisocyanate, 4,4'-diisocyanatodiphenylmethane or m-xylylenediisocyanate, preferably in the presence of a small amount of a glycol of 4 to 10 carbon atoms, such as 1,4-butanediol, as chain extender. Suitable polyester-urethanes manufactured in this way have a tensile strength of about 300 to 650 kg/cm$^2$ and an elongation at break of about 300 to 700%.

The polyether-urethanes contained in the magnetic binder mixture according to the invention can be manufactured, in particular, in accordance with the instructions of U.S. Pat. No. 2,899,411. They are produced by reacting a polyether having a molecular weight of from 800 to 4,000 and based on an aliphatic glycol or cyclic ether of 3 to 6 carbon atoms, with a diisocyanate of 8 to 20 carbon atoms such as toluylenediisocyanate, preferably in the presence of a small amount of a glycol of 4 to 12 carbon atoms as chain extender. Suitable polyether-urethanes have a tensile strength of about 300 to 650 kg/cm$^2$ and an elongation at break of 400 to 700%.

The vinyl chloride/dialkyl maleate copolymers suitable for admixture with the polyurethanes can be manufactured by conventional methods, for example by emulsion copolymerization or suspension copolymerization. The dialkyl maleates employed are esters of maleic acid with aliphatic alcohols of 1 to 3 carbon atoms.

The copolymers used according to the invention contain from 50 to 90, and especially from 70 to 90, percent by weight of vinyl chloride units and from 10 to 50, and especially 10 to 30, percent by weight of dialkyl maleate units. Particularly suitable copolymers contain from 70 to 90 percent by weight of vinyl chloride units, from 5 to 15 percent by weight of dimethyl maleate units and from 5 to 15 percent by weight of diethyl maleate units. A 15% strength solution of particularly suitable copolymers, such as vinyl chloride/dimethyl maleate/diethyl maleate copolymers, in a mixture of equal parts by volume of tetrahydrofuran and dioxane has a viscosity of about 220 cp at 20° C. The K value (according to H. Fikentscher, Cellulose-Chemie, 30, 58 et seq (1932)) of particularly suitable products is from 50 to 65, and preferably from about 55 to 60.

It is a particular advantage of the mixture according to the invention that its excellent pigment binding properties permits high concentrations of magnetic pigment in the magnetic coating without impairing the latter's mechanical properties. In addition, the very smooth surfaces which can be obtained with the mixture according to the invention are of particular advantage in the recording and reproduction of high frequencies.

The abrasion resistance of the magnetic coatings manufactured according to the invention can be improved even further and their thermoplasticity can be reduced by adding further polyisocyanates, preferably diisocyanates or triisocyanates, such as 4,4'-diisocyanatodiphenylmethane, or a triisocyanate derived from 3 moles of a diisocyanate, such as toluylenediisocyanate and 4,4'-diisocyanatodiphenylmethane, and 1 mole of a triol, such as glycerol or 1,1,1-trimethylolpropane, especially the reaction product of 3 moles of toluylenediisocyanate and 1 mole of 1,1,1-trimethylolpropane, such polyisocyanates being preferably added to the ready-to-use magnetic dispersion before application to the base. The amount of polyisocyanates added for this purpose is generally about 1 to 15 percent by weight, based on the total amount of binder.

The preferred vinyl chloride/dialkyl maleate copolymers and polyurethanes which are used, according to the invention, as binders in the manufacture of magnetic dispersions (which can be effected by conventional methods) should be soluble in the volatile organic solvents conventionally used in the manufacture of magnetic dispersions such as tetrahydrofuran, dimethylformamide, dioxane and mixtures of these solvents as well as in mixtures of these solvents with volatile ketones, esters and/or aromatic hydrocarbons, such as methyl ethyl ketone, ethylglycol acetate, benzene and toluene.

The magnetic coatings may also have added to them in a conventional manner small amounts of dispersing agents, fillers and lubricants during dispersion of the magnetic pigments or prior to application of the magnetic coating. Examples of these additives are fatty acids or isomerized fatty acids, such as stearic acid, or their salts with metals of main groups I to IV of the periodic system, amphoteric electrolytes such as lecithin, and fatty acid esters or waxes, silicone oils, carbon black and the like. The additives are used in the conventional amounts, generally less than 10 percent by weight, based on the magnetic coating, being added.

Suitable magnetic pigments are those known per se, the properties of the finished magnetic coating being governed, inter alia, by the magnetic pigment used. Examples of such magnetic pigments are gamma-iron-(III) oxide, finely divided magnetite, ferromagnetic chromium dioxide, cobalt-modified gamma-iron(III) oxide and ferromagnetic metals and metal alloy pigments, such as alloys of iron and cobalt (manufactured, for example, in accordance with the instructions in German Pat. No. 1,247,026). The preferred magnetic pigment is acicular gamma-iron(III) oxide. The particle size is as a rule from 0.2 to $2\mu$, the preferred range being from 0.3 to $0.8\mu$.

The ratio of magnetic pigment to binder in the recording media according to the invention is generally from 1 to 10:1 and in particular from 4 to 6:1. A particular advantage of the mixture according to the invention is that, due to its excellent pigment binding power, high concentrations of magnetic pigment are possible in the magnetic coatings without their mechanical properties being impaired and their service characteristics suffering appreciably.

Conventional rigid or flexible base materials can be used as non-magnetic and non-magnetizable bases. Particularly suitable flexible bases are films of linear polyesters, such as polyethylene terephthalate, generally particularly from 10 to $36\mu$. Aluminum or aluminum alloy discs may for example be used as rigid non-magnetizable bases. More recently, the use of magnetic coatings on paper bases has become important for electronic computing and accounting machines; the coating materials according to the invention can be used with advantage for this purpose, too.

Preparation of the magnetic coatings may be carried out in a conventional manner. The magnetic dispersion prepared from the magnetic pigment and the binder solution in the presence of dispersing agents and other additives in dispersing apparatus, e.g. a tube mill or a stirred ball mill, is advantageously filtered and applied to the non-magnetizable base using conventional coating equipment, e.g. a knife coater. Usually, orientation of the magnetic particles is effected before the fluid mix has dried on the base, drying being advantageously carried out for from 2 to 5 minutes at temperatures of from 50° to 90° C. If binder mixtures are used to which polyisocyanates have been added, there is no need, in contrast to some known polyisocyanate binders, to subject the coated material to a heat treatment after coating, i.e. one which goes beyond normal physical drying, e.g. curing.

The magnetic coatings may be subjected to a conventional surface treatment, e.g. calendering in which the coated material is passed between polished rollers, with the optional application of pressure and optional heating at temperatures of from 50° to 100° C., preferably from 60° to 80° C. Following this treatment the thickness of the magnetic coating is generally from 3 to $20\mu$ and preferably from 8 to $15\mu$. In the case of the production of flexible magnetic tapes, the coated webs are slit in the longitudinal direction to the usual widths.

The magnetic recording media of the invention are distinguished by excellent mechanical properties and a very smooth surface. In particular, the unusually good orientatability of the magnetic particles during manufacture of the magnetic coating should be emphasized.

The parts and percentages given in the following Examples and comparative tests are by weight, unless stated otherwise.

EXAMPLE 1

A tube mill is charged with 8.200 parts of steel balls having diameters of from 4 to 6 mm and then with the following mixture: 700 parts of acicular gamma-iron-(III) oxide, 427 parts of a mixture of equal parts of tetrahydrofuran and dioxane, 17.5 parts of lecithin, 1.4 parts of polydimethylsiloxane and 210 parts of a 20% strength solution of a copolymer containing 80% of vinyl chloride units, 10% of dimethyl maleate units and 10% of diethyl maleate units (K value=58) in a mixture of equal parts of tetrahydrofuran and dioxane.

This mixture is dispersed for 40 hours and then 754 parts of a 13% strength solution of a thermoplastic polyester-urethane derived from adipic acid, 1,4-butanediol and 4,4'-diisocyanatodiphenylmethane in a mixture of equal parts of tetrahydrofuran and dioxane are added. After dispersing for a further 10 hours, the magnetic dispersion obtained is filtered under pressure through a filter having a pore width of $5\mu$. A polyethylene terephthalate film is coated with the magnetic dispersion in a conventional manner using a knife coater and, after the coated web has been passed through a magnetic field, the coating is dried at a temperature of from 60° to 100° C. After drying, the magnetic coating has a thickness of $5\mu$. The coated web is calendered by passing it between heated rollers (80° C.) at a nip pressure of approx. 3 kg/cm and then slit into tapes of conventional width, for example 6.25 and 3,81 mm in the case of audio tapes. The tapes thus obtained possess excellent frictional characteristics and good abrasion resistance. The magnetic properties volumetric packing density are given in Table 1 below. The surface of the coating exhibits a low peak-to-valley height which is particularly advantageous for the high-quality recording and reproduction of high frequencies.

COMPARATIVE EXPERIMENT A

The procedure of Example 1 is followed except that the copolymer of vinyl chloride, dimethyl maleate and diethyl maleate is replaced by a thermoplastic polyester-urethane prepared from adipic acid, 1,4-butanediol and 4,4'-diisocyanatodiphenylmethane. The magnetic properties and volumetric packing density of the magnetic coatings of the resulting magnetic tapes are given in Table 1.

COMPARATIVE EXPERIMENT B

The procedure of Example 1 is followed except that the copolymer of vinyl chloride, dimethyl maleate and diethyl maleate is replaced by a partially hydrolyued copolymer of vinyl chloride and vinyl acetate, such as is described in U.S. Pat. No. 2,513,726, the weight ratio of vinyl chloride units to vinyl acetate units to vinyl alcohol units in the copolymer being 91:6:3. The magnetic properties and volumetric packing density of the magnetic coatings of the resulting magnetic tapes are given in Table 1.

COMPARATIVE EXPERIMENT C

The procedure of Example 1 is followed except that the copolymer of vinyl chloride, dimethyl maleate and diethyl maleate is replaced by a copolymer containing 87% of vinyl chloride units and 13% of vinyl acetate units, such as is described in U.S. Pat. Nos. 1,935,577 and 2,052,658. The magnetic properties and volumetric packing density of the magnetic coatings of the resulting magnetic tapes are given in Table 1.

COMPARATIVE EXPERIMENT D

The procedure of Example 1 is followed except that the copolymer of vinyl chloride, dimethyl maleate and diethyl maleate is replaced by a phenoxy resin as described in German Printed Application No. 1,295,011 as component for blending with polyurethanes. The magnetic properties and volumetric packing density of the magnetic coatings of the resulting magnetic tapes are given in Table 1.

COMPARATIVE EXPERIMENT E

The procedure of Example 1 is followed except that the copolymer of vinyl chloride, dimethyl maleate and diethyl maleate is replaced by a polycarbonate as described in German Published Specification No. 2,114,611 as component for blending with polyurethanes. The magnetic properties and volumetric packing density of the magnetic coatings of the resulting magnetic tapes are given in Table 1.

EXAMPLE 2

The procedure of Example 1 is followed except that immediately before the magnetic dispersion is applied to the base material, 2 parts of triisocyanate (a reaction product of 1 mole of 1,1,1-trimethylolpropane with 3 moles of toluylenediisocyanate), based on 100 parts of the solid binder combination, are added. The magnetic properties and volumetric packing density of the magnetic coatings of the resulting magnetic tapes are given in Table 1.

EXAMPLE 3

A tube mill is charged with 8,200 parts of steel balls having diameters of from 4 to 6 mm and then with the following mixture: 700 parts of acicular gamma-iron-(III) oxide, 427 parts of a mixture of equal parts of tetrahydrofuran and dioxane, 17.5 parts of lecithin, 1.4 parts of polydimethylsiloxane and 210 parts of a 20% strength solution of a copolymer containing 80% of vinyl chloride units, 10% of dimethyl maleate units and 10% of diethyl maleate units (K value=58) in a mixture of equal parts of tetrahydrofuran and dioxane.

This mixture is dispersed for 40 hours and then 653 parts of a 15% strength solution of a thermoplastic polyether-urethane which is free of isocyanate groups and has been manufactured from polyoxytetramethylene (polytetrahydrofuran) with terminal hydroxyl groups, 1,4-butanediol and 4,4'-diisocyanatodiphenylmethane, in a mixture of equal parts of tetrahydrofuran and dioxane, and 285 parts of a mixture of tetrahydrofuran and dioxane are added. After dispersing for a further 10 hours, the magnetic dispersion obtained is further processed as described in Example 1. The magnetic properties and volumetric packing density of the magnetic coatings of the resulting magnetic tapes are given in Table 1.

EXAMPLE 4

A tube mill is charged with 8,200 parts of steel balls having diameters of from 4 to 6 mm and then with the following mixture: 700 parts of acicular gamma-iron-(III) oxide, 420 parts of a mixture of equal parts of tetrahydrofuran and dioxane, 17.5 parts of lecithin, 1.4 parts of polydimethylsiloxane and 350 parts of a 20% strength solution of a copolymer containing 80% of vinyl chloride units, 10% of dimethyl maleate units and 10% of diethyl maleate units (K value=58) in a mixture of equal parts of tetrahydrofuran and dioxane.

This mixture is dispersed for 40 hours and then 467 parts of a 15% strength solution of a thermoplastic polyether-urethane which is free of isocyanate groups and has been obtained from polyoxytetramethylene with terminal hydroxyl groups, 1,4-butanediol and 4,4'-diisocyanatodiphenylmethane, in a mixture of equal parts of tetrahydrofuran and dioxane, and a further 303 parts of a solvent mixture consisting of equal parts of tetrahydrofuran and dioxane are added. The further processing of the dispersion is as described under Example 1. The magnetic properties and volumetric packing density of the magnetic coatings of the resulting magnetic tapes are given in Talbe 1.

COMPARATIVE EXPERIMENT F

The procedure of Example 3 is followed except that the copolymer of vinyl chloride, dimethyl maleate and diethyl maleate is replaced by a thermoplastic polyether-urethane which is free of isocyanate groups and has been obtained from polyoxytetramethylene with terminal hydroxyl groups, 1,4-butanediol and 4,4'-diisocyanatodiphenylmethane. The magnetic properties and volumetric packing density of the magnetic coatings of the resulting magnetic tapes are given in Table 1.

COMPARATIVE EXPERIMENT G

The procedure of Example 3 is followed except that the copolymer of vinyl chloride, dimethyl maleate and diethyl maleate is replaced by a partially hydrolyzed copolymer of vinyl chloride and vinyl acetate, such as is described in U.S. Pat. No. 2,513,726, the weight ratio of vinyl chloride units to vinyl acetate units to vinyl alcohol units in the copolymer being 91:6:3. The magnetic properties and volumetric packing density of the magnetic coatings of the resulting magnetic tapes are given in Table 1.

Mixtures of the polyether-urethane with phenoxy resin, analogous to Comparative Experiment D, or with polycarbonate, analogous to Comparative Experiment E, cannot be used as magnetic coating binders because of the incompatibility of the polymers with one another.

TABLE 1

Magnetic properties, volumetric packing densities and peak-to-valley heights of the magnetic coatings of the magnetic tapes produced according to Examples 1 to 4 and according to Comparative Experiments A to G.

| Experiment | Magnetic properties in recording direction | | Orientation ratio | Packing density (g/cm$^3$) | Peak-to-valley height $R_t$ ($\mu$) | Recordability (db) (at 8 kc/s, with reference to DIN reference tape C 521 V) |
|---|---|---|---|---|---|---|
| | $H_c$ (kilo-amps/m) | 4 $I_R$ (gauss) | | | | |
| Example 1 | 24.9 | 1380 | 2.09 | 2.12 | 0.25 | +2.0 |
| Example 2 | 24.6 | 1360 | 2.11 | 2.09 | 0.25 | +2.4 |
| Comparative Experiment A | 24.7 | 1200 | 1.88 | 1.86 | 0.80 | +0.3 |
| Comparative Experiment B | 24.0 | 1160 | 1.90 | 1.92 | 0.5 | 0 |
| Comparative Experiment C | 24.7 | 1190 | 1.92 | 1.90 | 0.5 | +0.2 |
| Comparative Experiment D | 24.6 | 1100 | 1.57 | 1.78 | 0.35 | −1.0 |
| Comparative Experiment E | 24.8 | 1230 | 1.88 | 1.85 | 0.45 | −0.6 |
| Example 3 | 24.8 | 1430 | 2.14 | 2.23 | 0.1 | +4.5 |
| Example 4 | 25.1 | 1420 | 2.22 | 2.13 | 0.15 | +2.8 |
| Comparative Experiment F | 24.8 | 1220 | 1.92 | 1.94 | 0.80 | +1.1 |
| Comparative Experiment G | 24.7 | 1240 | 1.94 | 1.92 | 0.30 | +1.3 |

Table 1 compares the magnetic properties and the packing densities of the magnetic coatings of the resulting magnetic tapes. The degree of saturation remanence has a considerable influence on the quality of the magnetic recording. The degree of saturation remanence also has a decisive effect on the signal-to-noise ratio and maximum output level in audio work and on the obtainable recording level in data processing and video work. Table 1 shows that the magnetic coatings which have been prepared using binder mixtures of the invention (Examples 1 and 4) show a remarkable increase in the saturation remanence on account of a higher volumetric packing density and a higher orientation ratio as compared with the magnetic coatings containing other binder combinations (Comparative Tests A to G). The orientation ratio is the ratio of the saturation remanence in the recording direction to the saturation remanence in the crosswise direction and is a measure of the orientability of the magnetic particles. The magnetic properties were measured in a vibrating-sample magnetometer at a magnetic field strength of 1,300 oersteds.

The volumetric packing density is defined as the weight of magnetizable material in grams per cm$^3$ of coating.

The peak-to-valley height ($R_t$ value) of the magnetic coatings was measured with a commercially available instrument manufactured by Fa. Perthen, Hanover, Germany. Of magnetic coatings, those which were produced using the mixtures according to the invention had the smoothest surfaces.

The recordability at short wavelengths is governed particularly by the surface quality and the packing density of the magnetic particles contained in the coating. As can be seen from the Table, the coatings which contain the binder mixture according to the invention exhibit a particularly advantageous recordability at short wavelengths which was measured according to DIN draft specification 45,512 (cassette tape 3.81 mm wide) at a tape speed of 4.75 cm/sec. The recordability at short wavelengths was determined at the optimum HF bias setting of the tape.

We claim:

1. Magnetic recording media comprising a non-magnetic base and, applied thereto, a firmly adhering magnetic coating consisting essentially of a dispersion of finely divided magnetic pigments in a binder mixture, wherein the binder mixture consists essentially of from 40 to 80 percent by weight of an elasteromeric polyurethane which is soluble in a volatile organic solvent, and is free of isocyanate groups and from 20 to 60 percent by weight of a vinyl chloride copolymer which contains from 50 to 90 percent by weight of vinyl chloride units and from 10 to 50 percent by weight of units of at least one diester of maleic acid with an alcohol of 1 to 3 carbon atoms.

2. The magnetic recording media of claim 1 in which the elastomeric polyurethane is derived from adipic acid, 1,4-butanediol and 4,4'-diisocyanatodiphenylmethane.

3. Magnetic recording media as claimed in claim 1, wherein the polyurethane is an elastomeric polyesterurethane obtained from adipic acid, 1,4-butanediol and 4,4'-diisocyanatodiphenylmethane and having a tensile strength of from 300 to 650 kg/cm$^2$ and an elongation at break of from 300 to 700%.

4. Magnetic recording media as claimed in claim 1, wherein the polyurethane is an elastomeric polyetherurethane obtained from polyoxytetramethylene with terminal hydroxyl groups, 1,4-butanediol and 4,4'-diisocyanatodiphenylmethane and having a tensile strength of from 300 to 650 kg/cm$^2$ and an elongation at break of from 400 to 700%.

5. Magnetic recording media as claimed in claim 1, wherein the polyurethane binder is mixed with a copolymer which contains from 70 to 90 percent by weight of vinyl chloride units and from 10 to 30 percent by weight of units of at least one the alcohol component of the dialkyl maleate having from 1 to 3 carbon atoms.

6. A magnetic recording media as set forth in claim 1 wherein said diester consists of a combination of substantially equal amounts of dimethyl maleate and diethyl maleate and wherein said non-magnetic base is selected from the group consisting of polyester film and aluminum or aluminum alloy discs and a paper base.

7. A magnetic recording media as set forth in claim 1 wherein said vinyl copolymer contains about 80% of vinyl chloride units, 10% of dimethyl maleate units and 10% of diethyl maleate units.

8. The magnetic recording media of claim 7 in which the elastomeric polyurethane is derived from adipic acid, 1,4-butanediol and 4,4'-diisocyanatodiphenylmethane.

9. The magnetic recording media of claim 8 in which the binder mixture contains from 40 to 80% by weight of elastomeric polyurethane and from 20 to 60% by weight of the vinyl chloride copolymer.

10. The magnetic recording media of claim 1 in which the elastomeric polyurethane is formed from (A1) a linear aliphatic polyester obtained from an aliphatic dicarboxylic acid of 4 to 5 carbon atoms and an aliphatic diol of 4 to 10 carbon atoms or from (A2) a linear aliphatic polyether selected from the group consisting of a polycondensate of an aliphatic diol of 3 to 6 carbon atoms and a polymer of a cyclic ether of 3 to 6 carbon atoms, by reaction with a diisocyanate of 8 to 20 carbon atoms and a glycol of 4 to 10 carbon atoms as a chain extender.

* * * * *